(No Model.) 2 Sheets—Sheet 1.
T. D. AYLSWORTH.
HAY PRESS.
No. 296,267. Patented Apr. 1, 1884.
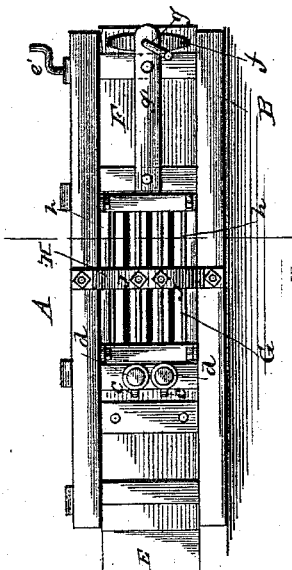
Fig. 1.
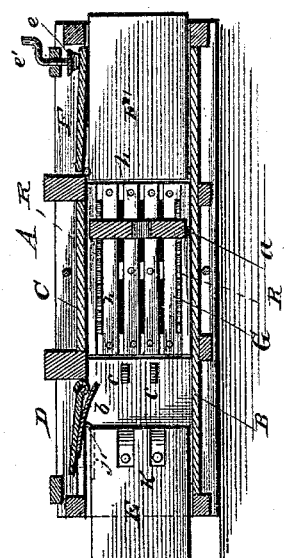
Fig. 2.
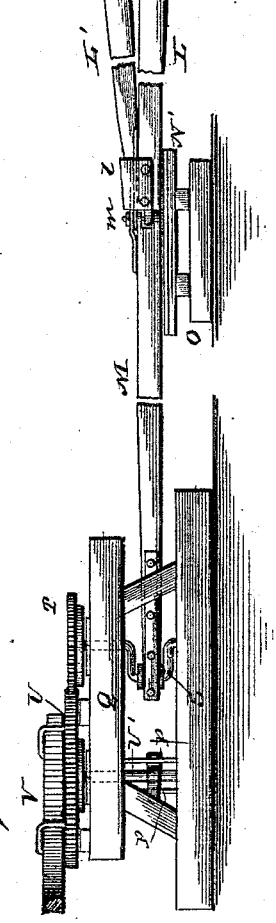
Witnesses:
Phil C. Dietrich
W. R. Keyworth
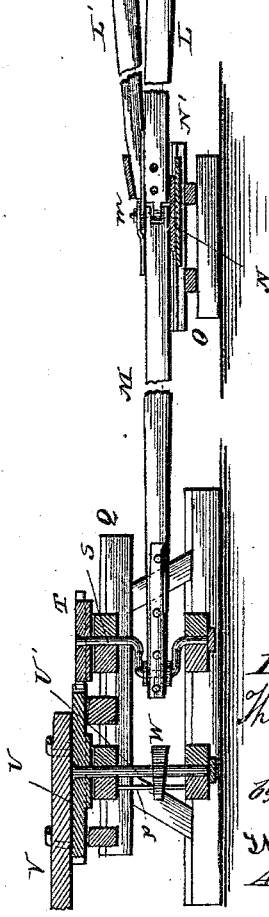
Inventor:
Thos. D. Aylsworth
by
J. N. Alexander
Attorney.

(No Model.) 2 Sheets—Sheet 2.
T. D. AYLSWORTH.
HAY PRESS.
No. 296,267. Patented Apr. 1, 1884.
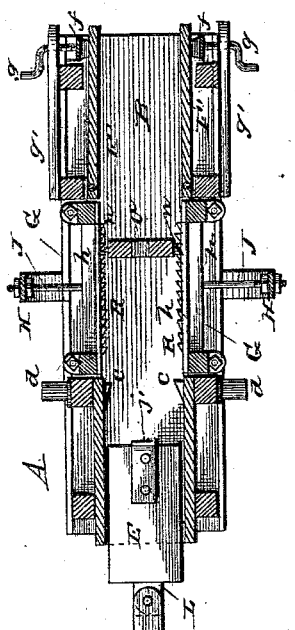
Fig. 3.
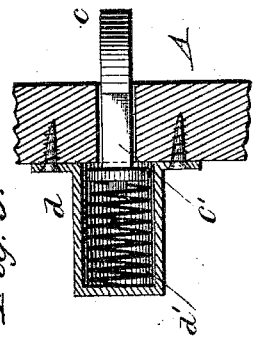
Fig. 5.
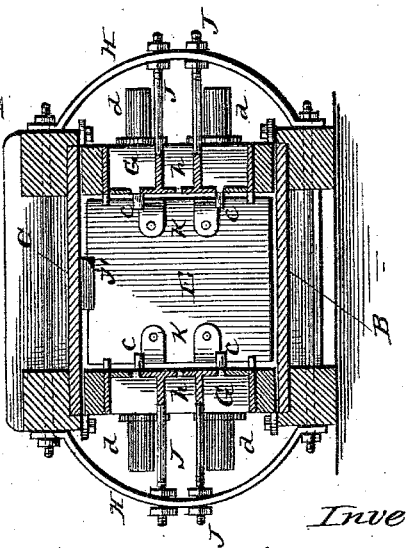
Fig. 4.
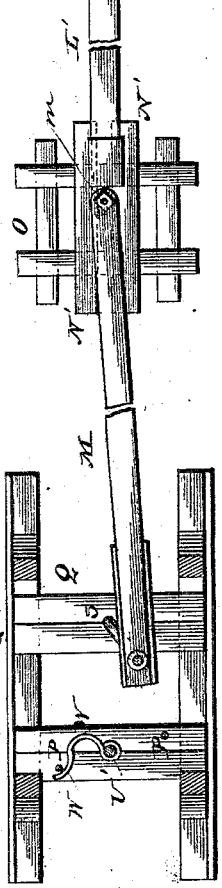
Witnesses:
Phil C. Dieterich
W. R. Keyworth
Inventor:
Thos. D. Aylsworth
by
J. W. Alexander
Attorney.

UNITED STATES PATENT OFFICE.

THOMAS D. AYLSWORTH, OF OSWEGO, KANSAS.

HAY-PRESS.

SPECIFICATION forming part of Letters Patent No. 296,267, dated April 1, 1884.

Application filed August 30, 1883. (No model.)

*To all whom it may concern:*

Be it known that I, THOMAS D. AYLSWORTH, of Oswego, in the county of Labette and State of Kansas, have invented certain new and useful Improvements in Hay-Presses; and I do hereby declare that the following is a full, clear, and exact description thereof, reference being had to the accompanying drawings, and to the letters of reference marked thereon, which form part of this specification, in which—

Figure 1 is a side elevation of the press, the jack, and the horse-power with its brake. Fig. 2 is a section taken longitudinally and centrally through the press-box. Fig. 3 is a section taken horizontally through the press-box and horse-power frame. Fig. 4 is a vertical section taken transversely through the press-box in the plane indicated on Fig. 1 by dotted line $xx$. Fig. 5 is a section through one of the spring bale-retainers detached from the press-box.

This invention relates to presses of the horizontal kind which are especially designed for baling hay, but which may be used for baling other products; and it consists in certain novel devices whereby the follower receives two throws at each revolution of the sweep, and the sweep is prevented from springing against the horse's legs during the process of compressing the material; also, in certain other novel devices, all of which will be fully understood from the following description, when taken in connection with the annexed drawings.

The frame A of the press-box consists of horizontal sill and roof beams united by vertical and transverse tie-beams rigidly and substantially secured together. B designates the floor of the press-box, which extends the entire length thereof, and C is the stationary roof or top of this box. The feed-opening, which is through the top of the press-box, near its front end, is provided with a hinged door, D, which, when a charge of hay has been put into the box in front of a dividing-block, $a$, is forced down upon the charge, for the purpose of causing it to press smoothly in the bale. To the bottom of the door D is secured a spring, $b$, the free end of which is at the rear of the door. This spring, together with spring-stops $c\ c$, prevents the hay from backing into the receiving-chamber when the follower E is retracted, to allow a new charge to be fed into said chamber. Each one of the spring-stops $c$ is beveled, as shown in Fig. 3, so as to allow the hay to be forced past it, and by its shoulder to prevent the backward expansion of the hay at the vertical sides of the box. Each beveled stop is constructed with a stem, $c'$, which extends into a box, $d$, secured to the main frame A, and is acted on by a spring, $d'$. By thus applying the springs $d'$ outside of the press-box they are not liable to tangle the hay, nor to be broken during the pressing operation.

F designates a cover, which is hinged to the roof C of the press-box, and provided with a semi-elliptic spring, $e$, which is attached by a swivel to the lower end of a screw, $e'$, which has a crank-handle on its upper end, and which is tapped through the rear top cross-bar of the press-frame. By turning the screw $e'$ the rear end of the cover F can be depressed more or less, for vertically contracting the rear or discharge end of the press-box.

F' F' designate two side gates, which are hinged at their front ends to the stationary sides of the press-box, and $ff$ designate semi-elliptic springs, which bear against the sides of the gates near their free ends, and which are attached by swivels to screws $g\ g$, that are tapped through pieces $g'$, fixed to the sides of the press-frame. By means of these screws the discharge end of the press-box can be contracted or expanded laterally, according to the degree of density which it is desired to give the bales.

G G designate two rectangular frames, which are applied to the intermediate section of the press-box and strongly braced. To these frames are rigidly secured horizontal ribbed bars $h$, of metal, between which are spaces of sufficient size to admit the introduction of the hands of an attendant for the purpose of tying the bands about the compressed bales. Each frame G is secured to the press-frame by means of bolts applied to the four corners, as shown in Fig. 1. H H are arched stays, which are rigidly secured to the top and bottom beams of the press-frame by means of tie-bolts and nuts, and J J are stay-bolts, which are permanently secured to the ribbed bars $h$, and which pass through the arched stays H, to which the bolts are secured by means of nuts, as shown in the drawings. By removing the bolts at one end of each frame G, and also the nuts on the bolts which secure said frame and its bars to the arched stays, and which secure these stays to the press-frame, the frame can be swung outward and the last bale removed from the press when the work of baling is completed.

E designates the follower, which is provided on top with a metal lip, $j'$, and on the front vertical edges with metal straps $k$, which are let into these edges. The outer end of this follower E has ears formed on it above and below a horizontal plane passing centrally through it, to the lower one of which ears the follower-rod L is pivoted, and to the upper ear the follower-brace L' is pivoted. This follower-brace rod extends back, and its end is received in a metal shoe or sheath, $l$, secured to the end of the follower-rod. The sheath and the follower-rod are connected to the end of a long pitman-rod, M, by means of a vertical pivot-bolt, $m$. This pivot-bolt also passes through a slide, N, and secures it to the bottom of the pitman-rod M. The slide N is free to reciprocate between guides N', which are on a jack-frame, O, that is spiked firmly to the ground. The extreme outer end of the pitman-rod M is connected to a bell-crank of the horse-power, hereinafter explained. In connection with the follower and between the bales I employ rectangular dividing-blocks $a$, each one of which is shod with metal, and provided with spring-actuated beveled pawl-latches $n$ near its four corners and on its vertical edges.

On the inner sides of the frame G, near their upper and lower ends, are racks R R, having teeth which are pitched toward the discharging end of the press-box. With said rack-teeth the pawl-latches $n$ on the dividing-blocks $a$ engage, thereby preventing the dividing-blocks from moving backward during the operation of pressing bales, but allowing the blocks to be moved forward and discharged with the bales from the press-box. The bell-crank to which the pitman-rod is attached is part of a shaft, S, which has its bearings in the upper and lower timbers of the frame Q of the horse-power. The upper end of the said crank-shaft S has a pinion spur-wheel, T, keyed on it, which engages with a master spur-wheel, U, on a vertical shaft, U', which also has its bearings in the frame Q. The diameters of the spur-wheels T U are such that the follower is caused to make two plunges during each revolution of the sweep, thereby greatly facilitating the work of pressing. The master-wheel U has a sweep, V, secured to it, to which the horse is hitched. To the shaft U', I secure a spring, W, which is of such length that during the revolution of said shaft this spring will bear first against one of two vertical rods, $p\ p$, and then against the other rod, thereby preventing the sweep from reacting and striking the legs of the horse in his travel.

Having described my invention, what I claim as new, and desire to secure by Letters Patent, is—

1. The combination, in a horizontal baling-press, of the spring-actuated beveled stops $c$, passed freely through the press-frame, with the spring-holding boxes outside of this frame, and a follower having bevels K, and a spring, $b$, on door D, substantially as described.

2. The combination, in a baling-press, of removable side frames having separated ribbed bars with the adjustable bolts J and the arched braces H, bolted to the press-frame, substantially as described.

3. The combination of the plunger, the plunger-rod pivoted to it below its center, the brace-rod pivoted to it above its center and connected to the plunger-rod by its sheath, the pitman-rod pivoted to the plunger-rod, and the slide working in the guides of a jack, all constructed and adapted to operate substantially in the manner and for the purposes described.

4. The combination of the plunger, the plunger-rods, the slide guided, as described, in ways on a jack-frame, the bell-crank, the pinion thereof, the master-wheel engaging with said pinion, the sweep secured to the master-wheel, the spring W on the shaft of this wheel, and the vertical arresting-rods $p\ p$ for said spring, all constructed and adapted to operate substantially in the manner and for the purposes described.

In testimony that I claim the foregoing as my own I affix my signature in presence of two witnesses.

T. D. AYLSWORTH.

Witnesses:
U. ORSBORN,
E. D. KINSEY.